May 6, 1958  E. E. FOSTER  2,833,027
METHOD FOR PREPARING BACKWOUND SPRINGS
FOR USE IN SPRING MOTORS
Filed May 5, 1954  2 Sheets-Sheet 1

INVENTOR
EDWIN E. FOSTER
BY Young, Emery & Thompson
ATTORNEYS

May 6, 1958  E. E. FOSTER  2,833,027
METHOD FOR PREPARING BACKWOUND SPRINGS
FOR USE IN SPRING MOTORS
Filed May 5, 1954  2 Sheets-Sheet 2

INVENTOR
EDWIN E. FOSTER

BY
ATTORNEYS

2,833,027

METHOD FOR PREPARING BACKWOUND SPRINGS FOR USE IN SPRING MOTORS

Edwin E. Foster, Austin, Tex., assignor to Majik-Ironers, Inc., Austin, Tex., a corporation of Texas Application May 5, 1954, Serial No. 427,835

5 Claims. (Cl. 29—173)

This invention relates to a coiled ribbon spring and spring motor and a method of making same.

It is an object of the invention to provide an approximately constant tension coiled ribbon spring in which the unwinding force of the spring is substantially constant throughout the entire length of the coiled spring during force transmittal from the extreme wound position to the position where the spring is completely unwound. A still further object of the invention is to produce a tempered and set torsion spring and then to wind the coil spring in the opposite direction in which the entire length of ribbon becomes effective to expend its force as a substantially constant effort during the entire unwinding or enlarging of the coils of the spring.

Another object of the invention resides in the provision of a ribbon torsion spring wound in a tightly coiled form so that any segment of the spring will assume a curvature in which the concave side is directed away from the center of the coiled spring in contrast with a normal coiled torsion spring in which the concave side faces toward the center. A further object of the invention resides in the means to restrain the spring so that it will always act throughout its entire length during its force movement as a motor and not just a small segment of the ribbon which is only utilized in known coiled torsion springs.

Figure 1:
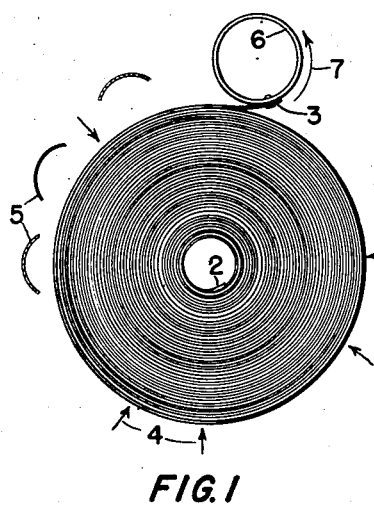
Figure 2:
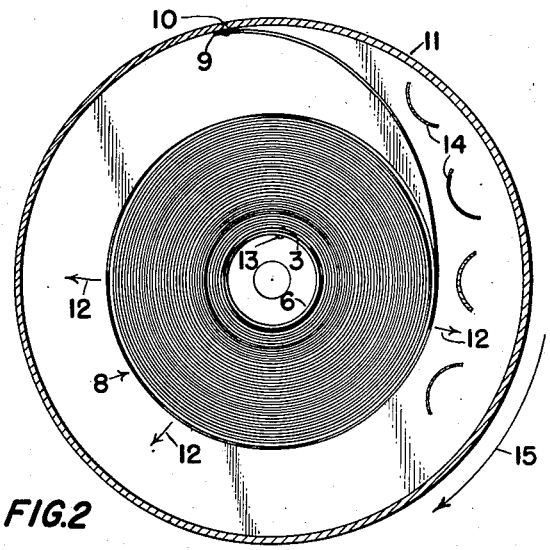
Figure 3:
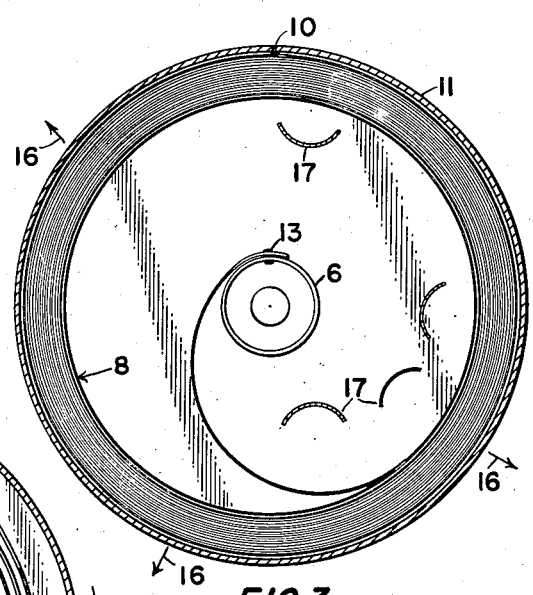
Figure 6:
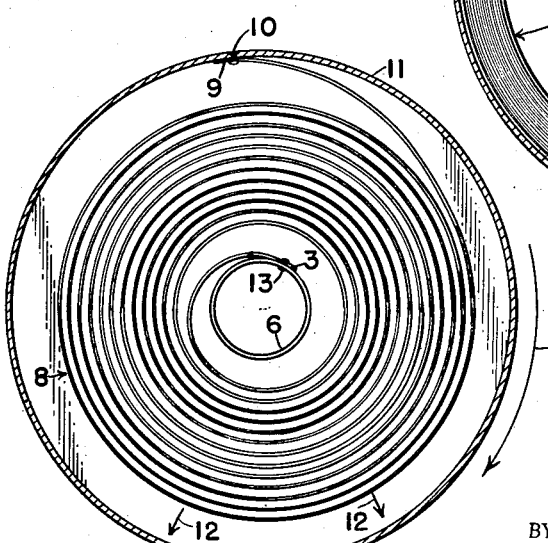
Figure 7:
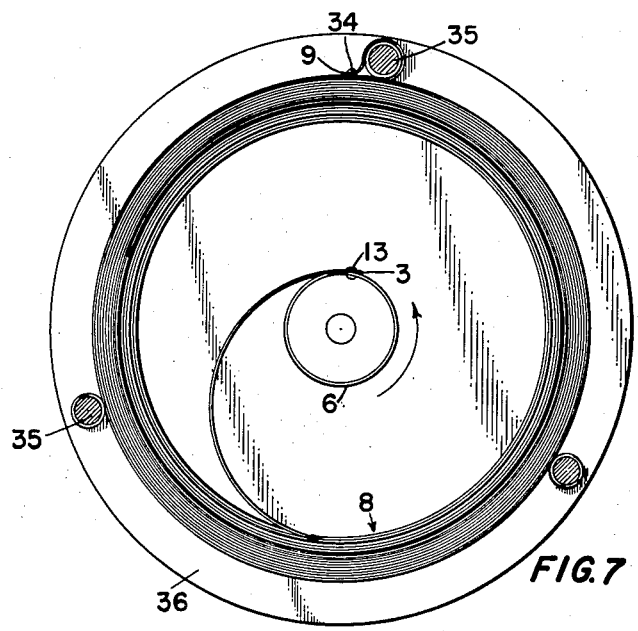
Figure 5:
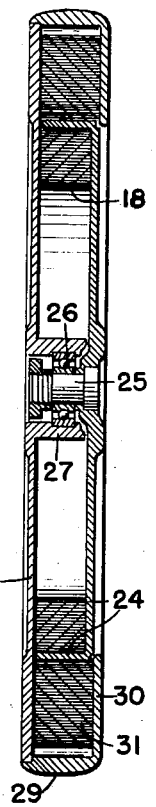
Figure 4:
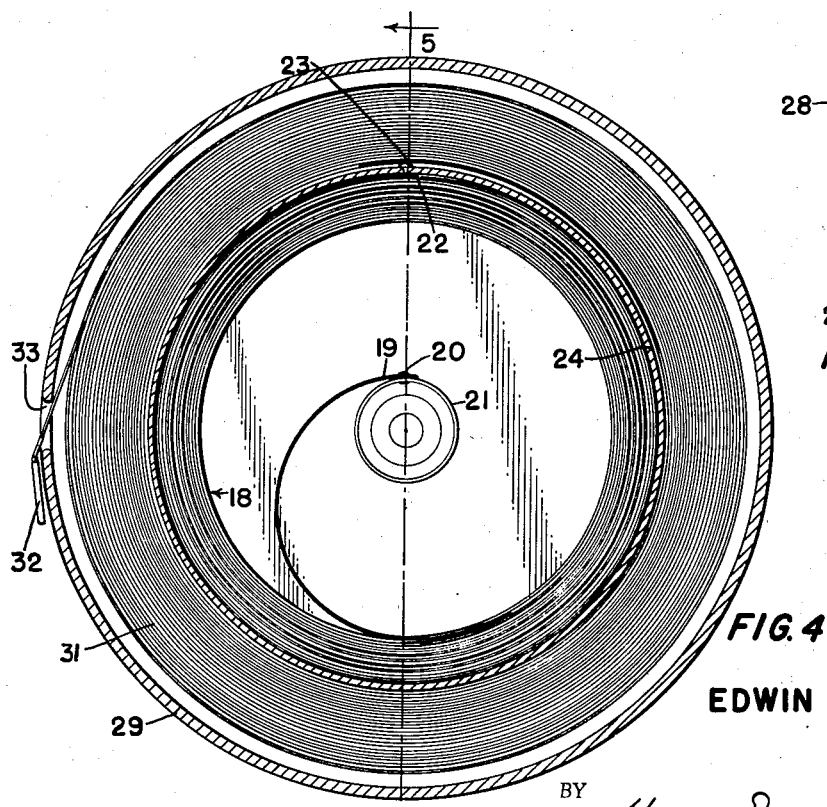

Further objects will be apparent from the following description when considered in connection with the accompanying drawings in which like reference characters indicate corresponding parts and in which Figure 1 is a side elevation of the tempered and set spring to be wound on its drum, Fig. 2 is a side elevation partly in section showing the spring wound in position for use, Fig. 3 is a side elevation partly in section similar to Fig. 2 showing the spring in an unwound position, Fig. 4 is a cross section through a measuring tape reel showing the spring in an unwound position, Fig. 5 is a cross section of the reel taken on line 5—5 of Fig. 4, Fig. 6 is a side view partly in section and similar to Figs. 2 and 3 showing the spring approximately one-half unwound, and Fig. 7 is a side view partly in section of a modified spring retainer.

The spring 1 shown in Fig. 1 is formed from a tempered band of spring metal set by any suitable method as for instance that disclosed in my U. S. Patent No. 2,609,191, issued September 2, 1952. The spring 1 is composed of closely wound spiral coils and is in the form of a ribbon of such width and thickness as may be desired depending upon the force of the spring required and its overall size. The spring 1 has an inner end 2 and an outer end 3 and the force of the spring as to the outer coil is in the direction of the arrow 4. The segments 5 indicate the normal coil or curvature of any short length of the coils if cut anywhere from the complete coil and represents the set of the spiral ribbon. In preparing the coil 1 for use in accordance with this invention, the outer end 3 of the spiral is connected to a drum 6 and the latter is turned counter-clockwise in the direction of the arrow 7 which latter shows the winding direction of the ribbon on the spool or drum 6. When completely wound in this direction, as shown by coil 8 in Fig. 2, the end 2, which was the inner end of the coil shown in Fig. 1 is now the outer end 9 of the coil 8 and is secured to a pin or rivet 10 in an outer drum or spool 11. In this position of the coil 8 the forces of the spring are directed outwardly as indicated by the arrows 12 which is opposite to the forces in the coil of Fig. 1. The coil 8 is wound on the drum 6 with its end 3 secured at or on pin 13 as indicated. The segments 14 indicate the normal coil of the spring ribbon if cut anywhere from the complete coil and it will be noted that the segments have their concave faces directed away from the center of the coil whereas in Fig. 1 the concave faces of the segments 5 face toward the center of the coil.

In Fig. 2 the spring is completely coiled on the drum 6 and exerts a force on the drum 11 in the direction of the arrow 15. As soon as the drum 6 is permitted to rotate in this direction this force is effective throughout the entire length of the coil 8 from the rivet 10 to the pin 13 since the convolutions of the spring 8 will "open" slightly to a less closely wound position as shown in Fig. 6. As the drum 11 rotates counter-clockwise in the direction of the arrow 15 the coils will finally spirally come to rest against the inside peripheral surface of the drum 11 as shown in Fig. 3 with the force of the spring 8 still directed outwardly as indicated by the arrows 16. In this Fig. 3 the segments 17 cut from the coil will assume the curvature of the normal set coil as indicated.

The torsion spring according to this invention is applicable for many uses and can be used in a great many devices and different kinds of implements, motors, gadgets and toys. For instance the spring is particularly applicable as motors for cameras, clocks, springs devices for toys and other devices, measuring tape reels, various winding and reeling devices, and other machines and devices. As an example, Figs. 4 and 5 show the invention applied to a measuring tape in which the spring coil 18 is connected at the inner end 19 to the small drum 21 at 20 with the outer end 22 connected by pin or rivet 23 to a drum 24. The drum 24 with the spring is rotatably mounted on a pin or bolt 25, Fig. 5, by means of a ball bearing 26 mounted in a hub member 27. The latter is preferably integral with the stationary casing 28 having a rim portion 29 extending around to the other side 30 to the peripheral edge of the drum 24. Thus the members 28, 29 and 30 form a circular chamber to receive a tape 31 of steel, fabric or other suitable material secured at its inner end to the pin 23 and having a wire loop 32 at its outer end. The tape 31 passes through an opening 33 in the peripheral surface 29 of the outer casing. In the position of the parts as shown in Fig. 4 upon pulling out the tape 31 the spring 18 gradually changes its position until the position of Fig. 2 is reached wherein the entire length of the tape is completely pulled out of the casing. During the entire travel of the tape out of the reel casing the return pull to rewind is exactly the same from the position of Fig. 4 to that of Fig. 2. In other words the force of the spring urging rewind of the tape is substantially constant from the position of Fig. 2 to Fig. 4 throughout the entire length of the spring.

The operation of the spring is believed to be obvious from the description and the drawings. It is of course necessary to restrain the movement of the spring such as by the housing or casing 11 and the pins or points at each end of the spring must be fixed except as to relative circumferential movement of the pins so that one pin or end of the spring rotates relative to the other end. The force of the spring 8 in Fig. 2 acts throughout its entire length from the pin 13 to the pin 10 so that as the tape 31 is pulled out of the casing 28, 29 and 30 the drum 24 rotates so that the spiral turns of the spring will build up around the inner peripheral surface of the drum 11 to the end position as indicated in Figs. 3 and 4 in which position the tape is completely out to the end of the measure for which the device is designed. In both positions of Fig. 4 and Fig. 3 the pull on the tape 31 to tend to rewind the latter is practically exactly the same.

Fig. 6 shows the spring 8 partially unwound in ultimately reaching the position of Fig. 3 from Fig. 2. Of course at any point the spring 8 may be permitted to unwind and expand to the position of Figs. 3 and 4 and it will be observed that the coils of the spring in Fig. 6 are practically out of contact with each other.

Fig. 7 shows a modified restraining means for the spring in which the spring 8 has, as usual, its inner end 3 secured to a pin or rivet 13 which latter is mounted in a drum 6. The outer end 9 of the coil 8 is secured on a lug 34 mounted on a pin 35 of which any suitable number are mounted on a disc 36 of which latter there may be two spaced apart to accommodate the spring. Thus in this modification the spring is mounted on and between a pair of plates or discs to keep the spring in place.

In the manufacture of the spring according to the invention it is of course possible to give the tempered spring ribbon a set, which may be substantially constant or which may vary throughout the length of the spring as shown in applicant's Patent No. 2,609,191 previously referred to. Then the ribbon is wound in reverse direction on a drum to the position of Fig. 2 in which position and condition the spring is complete and ready for use.

It is also possible to reverse wind the ribbon directly as it issues from the setting machine into the coil of Fig. 2 which is the reverse of the coil shown in Fig. 7 of the said patent. Also the ribbon may be tempered and set and provided in a longitudinally directed ribbon and then wound in the direction of Fig. 2 direct without first winding it into a coil in the direction of and as shown in Fig. 1.

The normal set in the spring may be uniform or approximately so, but it is also possible to have a stronger or weaker set at one or both ends of the spring relative to the remaining portion thereof.

I claim as my invention:

1. A method of preparing a ribbon spring in operative relation within two relatively movable inner and outer concentric members comprising the steps of: stressing a ribbon of spring metal so that a longitudinal set is imparted thereto such that said ribbon when unrestrained will take the form of a closely wound coiled spring; securing the outer end of a said closely wound ribbon spring to said inner member; backwinding said spring on said inner member in a direction such that the coils thereof are given an opposite curvature, the diameter of said inner member and the elasticity of said spring being such that the deflection of substantially all of said spring when so backwound is within the elastic limit of the material comprising said spring and substantially the original longitudinal bias is maintained; and securing the outer end of said spring when so backwound to the interior surface of said outer member, whereby, when said outer member is permitted to move relative to said inner member, said outer member and said spring will rotate and said spring will move from a tightly backwound position on said inner member to a tightly backwound position abutting the interior surface of said outer member and will act throughout its entire length during substantially all of such force movement.

2. A method of preparing a ribbon spring in operative relation within two relatively movable concentric members comprising: the steps of stressing a ribbon of spring metal so that a longitudinal set is imparted thereto such that said ribbon when unrestrained will take the form of a closely wound coiled spring; securing the end of said ribbon that would form the inner end of said coiled spring to the inner of said concentric members; backwinding said ribbon on said inner concentric member in a direction opposite to that in which said spring will wind when unrestrained, the diameter of said inner member and the elasticity of said spring being such that the deflection of substantially all of said spring when so backwound is within the elastic limit of the material comprising said spring and substantially the original longitudinal bias is maintained; and securing the outer end of said spring when so backwound to said outer concentric member, whereby, when said outer member is permitted to move relative to said inner member, said outer member and said spring will rotate and said spring will move from a tightly backwound position on said inner member to a closely wound annular form within said outer concentric member and will act throughout its entire length during substantially all of such force movement.

3. A method of preparing a ribbon spring in operative relation within two relatively movable concentric members comprising: the steps of stressing a ribbon of spring metal so that a longitudinal set is imparted thereto; permitting said ribbon to coil upon itself to form a closely wound coiled spring; securing the outer end of said coiled spring to the inner of said concentric members; backwinding said ribbon on said inner concentric member in a direction opposite to that in which said spring will wind when unrestrained, the diameter of said inner member and the elasticity of said spring being such that the deflection of substantially all of said spring when so backwound is within the elastic limit of the material comprising said spring and substantially the original longitudinal bias is maintained; and securing the outer end of said spring when so backwound to said outer concentric member, whereby, when said outer member is permitted to move relative to said inner member, said outer member and said spring will rotate and said spring will move from a tightly backwound position on said inner member to a closely wound annular form within said outer concentric member and will act throughout its entire length during substantially all of such force movement.

4. A method of preparing a ribbon spring in operative relation within two relatively movable inner and outer concentric members comprising the steps of: securing one end of a ribbon of spring metal to an arbor member, said ribbon having a set imparted by prestressing such that, when unrestrained, said ribbon will take the form of a tightly wound coiled spring; winding said ribbon on said arbor in a direction opposite to the direction of wind of said form said ribbon will take when unrestrained until substantially all of said ribbon assumes a closely wound annular form on said arbor, the diameter of said arbor and the elasticity of said spring being such that the deflection of substantially all of said spring when so backwound is within the elastic limit of the material comprising said spring and substantially the original longitudinal bias is maintained; and securing the opposite end of said ribbon when so wound on said arbor to a restraining member concentrically and rotatably disposed in encompassing relation to said arbor, and then permitting relative rotation of said arbor and said restraining member so that said ribbon moves from said closely wound position on said arbor to a closely wound annular form of greater diameter, said ribbon being retained in said latter form by abutment with said restraining member.

5. A method of preparing a ribbon spring in operative relation within two relatively movable inner and outer concentric members comprising the steps of: successively stressing each increment of a ribbon of spring metal to provide a set therein such that said ribbon if unrestrained will take the form of a tightly wound coiled spring; securing the end of said ribbon initially so stressed to an arbor member; winding each stressed increment of said ribbon on said arbor in a direction opposite to the direction of wind of said form said ribbon will take when unrestrained until substantially all of said ribbon assumes a closely wound annular form on said arbor, the diameter of said arbor and the elasticity of said spring being such that the deflection of substantially all of said spring when so backwound is within the elastic limit of the material comprising said spring and substantially the original longitudinal bias is maintained; and securing the opposite end of said ribbon when so wound on said arbor to a restraining member concentrically and rotatably disposed in encompassing relation to said arbor, and then permitting relative rotation of said arbor and said restraining member so that said ribbon moves from said closely wound position on said arbor to a closely wound annular form of greater diameter, said ribbon being retained in said latter form by abutment with said restraining member.

References Cited in the file of this patent

UNITED STATES PATENTS

| | | |
|---|---|---|
| 377,489 | Logan | Feb. 7, 1888 |
| 1,166,870 | Wieser | Jan. 4, 1916 |
| 2,063,799 | Fornelius | Dec. 8, 1936 |
| 2,495,212 | DeVries et al. | Jan. 24, 1950 |
| 2,532,828 | Westfall | Dec. 5, 1950 |
| 2,587,308 | Gilette | Feb. 26, 1952 |
| 2,622,700 | Geyer | Dec. 23, 1952 |
| 2,714,019 | Williams et al. | July 26, 1955 |